United States Patent [19]
Hansen

[11] Patent Number: 5,318,141
[45] Date of Patent: Jun. 7, 1994

[54] LOW IMPACT TRACKED VEHICLES

[76] Inventor: David W. Hansen, 15905 NE 31st Ave., Ridgefield, Wash. 98642

[21] Appl. No.: 843,768

[22] Filed: Feb. 28, 1992

[51] Int. Cl.$^5$ .................... B62D 55/02; B62D 55/30
[52] U.S. Cl. ...................... 180/8.2; 180/7.1; 180/9.21; 180/9.5; 305/15; 305/31
[58] Field of Search ............ 180/7.1, 8.2, 8.7, 9.5, 180/9.1, 9.21, 9.26, 9.28, 9.3, 190, 9; 305/15, 29, 31, 32

[56] References Cited

U.S. PATENT DOCUMENTS

| | | | |
|---|---|---|---|
| 2,065,516 | 12/1936 | Dorst | 180/9.21 X |
| 2,423,544 | 7/1947 | Acton | 305/29 |
| 2,749,189 | 6/1956 | France et al. | 180/190 X |
| 2,998,998 | 9/1961 | Hyler et al. | 180/9.1 X |
| 3,148,743 | 9/1964 | Jarvi et al. | 305/29 X |
| 3,204,713 | 9/1965 | Shanahan et al. | 180/9.21 X |
| 3,930,553 | 1/1976 | Kopera et al. | 180/4.28 |
| 4,362,340 | 12/1982 | van der Lely | 180/9.21 X |
| 4,537,267 | 8/1985 | Satzler | 180/9.1 |
| 4,635,740 | 1/1987 | Krueger et al. | 180/9.21 |
| 4,650,259 | 3/1987 | Alexander et al. | 305/31 X |
| 4,727,949 | 3/1988 | Rea et al. | 180/8.2 X |
| 4,893,883 | 1/1990 | Satzler | 180/9.1 X |

FOREIGN PATENT DOCUMENTS 1900590  8/1970  Fed. Rep. of Germany ..... 180/9.26

*Primary Examiner*—Margaret A. Focarino
*Assistant Examiner*—Peter English
*Attorney, Agent, or Firm*—Townsend and Townsend Khourie and Crew

[57] ABSTRACT

An improved tracked vehicle that allows a substantial increase in a driven area supporting a vehicle without any proportional increase in weight of the vehicle itself. The vehicle can be driven over soft snow and mud so as to cause no damage to the terrain. The vehicle can be amphibious and can be highly maneuverable and capable of passing over different types of obstacles in its path. It can move at reasonable speed over sand, mud and swamp. The vehicle has special tracks and a T-bar assembly which keeps tension on the tracks at all times. The vehicle also has resilient finger-type grousers bolted to the tracks of the vehicle.

14 Claims, 12 Drawing Sheets

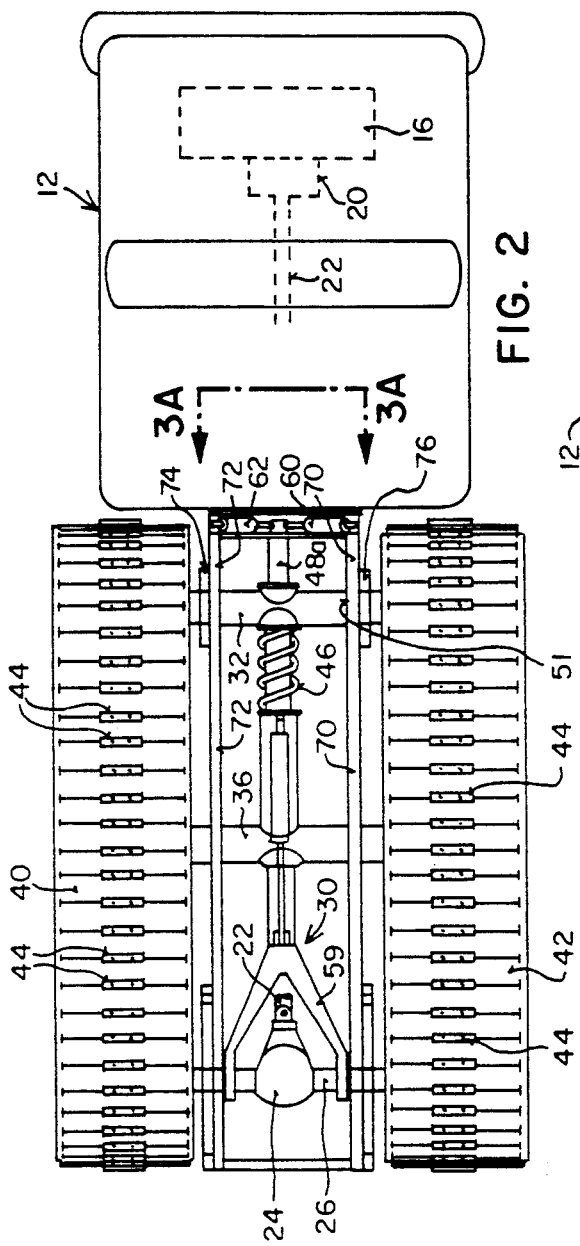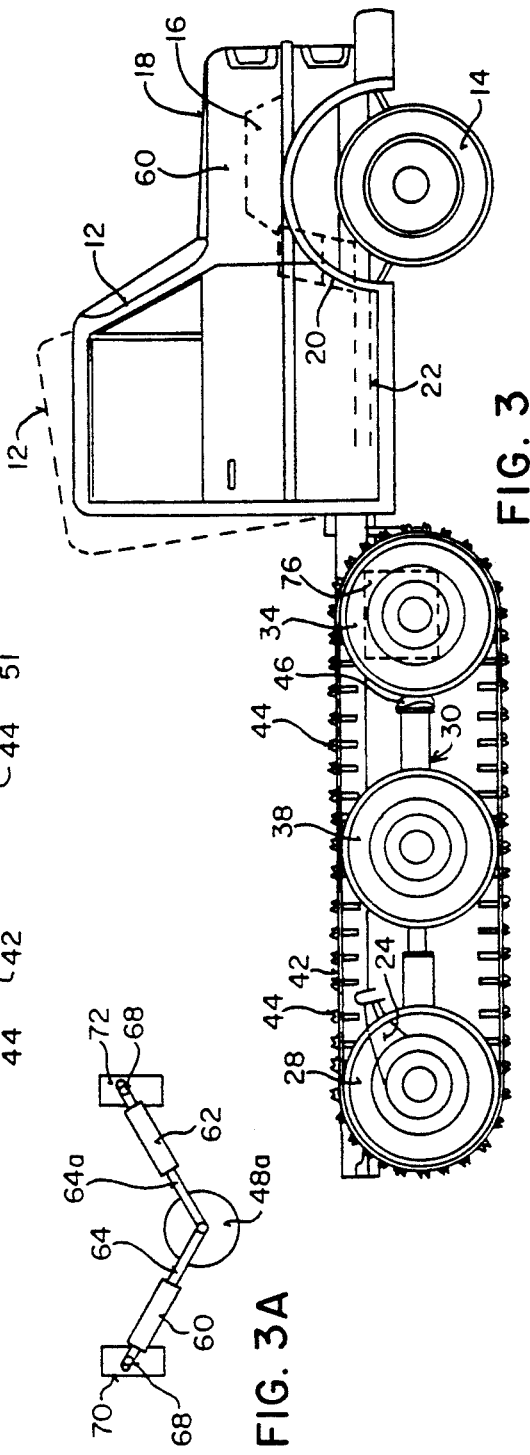

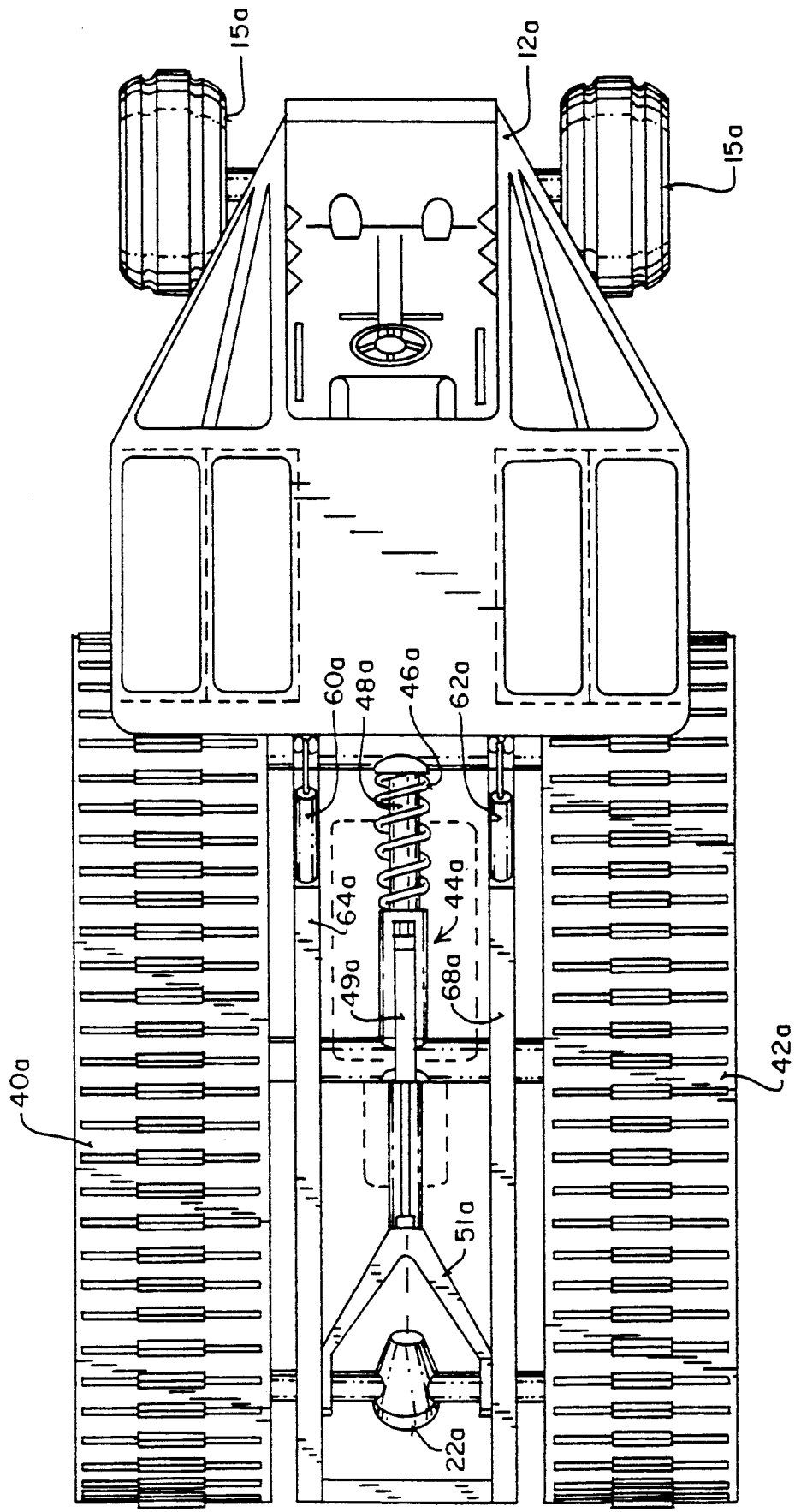

LOW IMPACT TRACKED VEHICLES

This invention relates to tracked vehicles designed for a number of different uses, such as for use in oil spill recovery and, more particularly, to vehicles which can be maneuverable over all types of terrain yet are stable and can pull heavy loads.

BACKGROUND OF THE INVENTION

Vehicles of different types have been developed which are intended to provide transport for men, equipment and materials to and from job sites over all types of terrain, including deep water. They have also been intended to support human resources at remote locations with shelter, safety and facilities and to provide a source of power attachments, accessories and associated power equipment. For the most part, attempts to provide such a vehicle have not been successful because of the complexity and cost of such a vehicle.

Oil companies are always interested in new technologies which can be used to improve oil spill recovery/rehabilitation processes. There is always a problem of transportation from a ship, boat or barge to the beach along shorelines and from the beach to land access roads. It is desirable that a single vehicle be able to accomplish these tasks and the vehicle should be amphibious and that the vehicle provide a power supply for hydraulic, mechanical and electrical attachments and accessories. Such a vehicle should also be capable of hauling personnel, equipment and materials at reasonable speeds over sand, mud and swamp so as to provide quick and effective access to many remote shoreline areas.

Conventional track vehicle systems generally consist of a frame, drive sprockets at either end or above the track frame and a series of idlers, with some means of flexibility to provide distribution of weight over rough terrain. This style of construction is typically found in the latest tanks of the U.S. Army and amphibious equipment of the U.S. Navy. Such a system is used on snow machines where improved ground loading is accomplished with wider tracks and maneuverability is provided with more power and counter rotating hydrostatic drives. The only significant entry in the SAE Journal since 1965 under the topic "Tracked Vehicles" is a Caterpillar Challenger. This is a vehicle with large V-belts for treads molded into the surface that is designed for less compaction on flat farmlands when pulling soil preparation mechanisms.

A need exists for a vehicle that can accomplish all of these tasks while being simple and rugged in construction and capable of withstanding loads of many different types notwithstanding the terrain over which the vehicle must move. The present invention satisfies this need.

SUMMARY OF THE INVENTION

The present invention provides an improved tracked vehicle that allows a substantial increase in a driven area supporting a vehicle without any proportional increase in weight of the vehicle itself. The vehicle can be driven over most terrain including soft snow and mud so as to cause substantially no damage to the terrain. The vehicle can be a mobile shelter and source of electrical, hydraulic and mechanical power and can be used to transport men and equipment from ship to shore and from the shore to land access roads spaced a distance from the shore.

The vehicle can be amphibious and can be highly maneuverable and capable of passing over different types of obstacles in its path. It can move at reasonable speed over sand, mud and swamp so as to provide quick and effective access means to many remote shoreline areas.

The vehicle of the present invention includes special tracks and a T-bar assembly which keeps tension on the tracks at all times, even when the vehicle is moving over and around obstacles. The vehicle also has resilient finger-type grousers bolted to the tracks of the vehicle.

The T-bar assembly of the present invention makes it possible to easily provide movement of a vehicle of any practical size that will carry men, machines and materials over substantially any terrain, including shallow water. The vehicle also operates safely and legally on highways and in all climates so that the need for roads and bridges is reduced. When it becomes feasible to build living shelters in the field or in a forest, on a hill or slope, with no highways, driveways and bridges available, the present invention provides a vehicle which can improve the standard of living by reducing operating cost of the vehicle. It is also possible with the vehicle to obtain natural privacy, security and a clean environment while reducing the impact on ecology.

The present invention is directed to a tracked vehicle which is movable over terrains of all different types including water. The simple T-bar assembly of the invention provides a simple means to present a reliable tracked system with an attitude adjustment that controls the angle of the tracks with respect to certain vehicles, i.e., the front wheels, of the vehicle. A prototype based upon a 33 horsepower, 2000 lb. tractor with hydrostatic drive has been found to move and maneuver with ease over all types of snow, mud and sand. The vehicle is able to climb ledges and slopes and to ford swamps, ponds and streams up to 3 feet deep without making ruts.

A typical truck using a T-bar structural feature of the present invention can have a weight to power ratio of 50 lbs. per horsepower, a weight to area ratio of 1 lb. per sq. in., and be capable of a 5000 lb. payload at highway speeds of up to 60 mph.

Another feature of the present invention is an improved grouser assembly which is virtually indestructible. Such assembly provides a sectional grouser concept that allows a track of the vehicle to be easily assembled or modified to serve a particular purpose. The adjustment feature originally intended to provide for a changing track angle in soft material became a new steering alternative. By using the left or right brakes of the vehicle and with the front wheels of the vehicle off the ground, a turning radius less than vehicle width can be achieved. This feature allows the vehicle to load itself upon trucks or trailers without ramps. It also allows the vehicle to climb over obstacles, such as rocks, logs and ledges.

The primary object of the present invention is to provide an improved vehicle which can be provided with a track tensioning feature which allows the vehicle to be movable over terrain of all different types including mud, sand, snow and swamps and be amphibious as well.

Other objects of this invention will become apparent as the following specification progresses, reference being had to the accompanying drawings for an illustration of several embodiments of the invention.

DESCRIPTION OF THE DRAWINGS

FIGS. 2 and 3 are top and side elevational views of the truck configuration of the present invention, FIG. 2 showing the T-bar structural feature with the three axles having the rear wheels of the vehicle;

FIG. 3A is a view of the drive means for the T-bar assembly of FIGS. 2 and 3, looking in the direction of line 3A—3A of FIG. 2;

FIGS. 4A, 5A and 6A are top plan, side elevational and front elevational views of a special, all-terrain vehicle having amphibious capabilities;

DESCRIPTION OF SPECIFIC EMBODIMENTS

Figure 1:
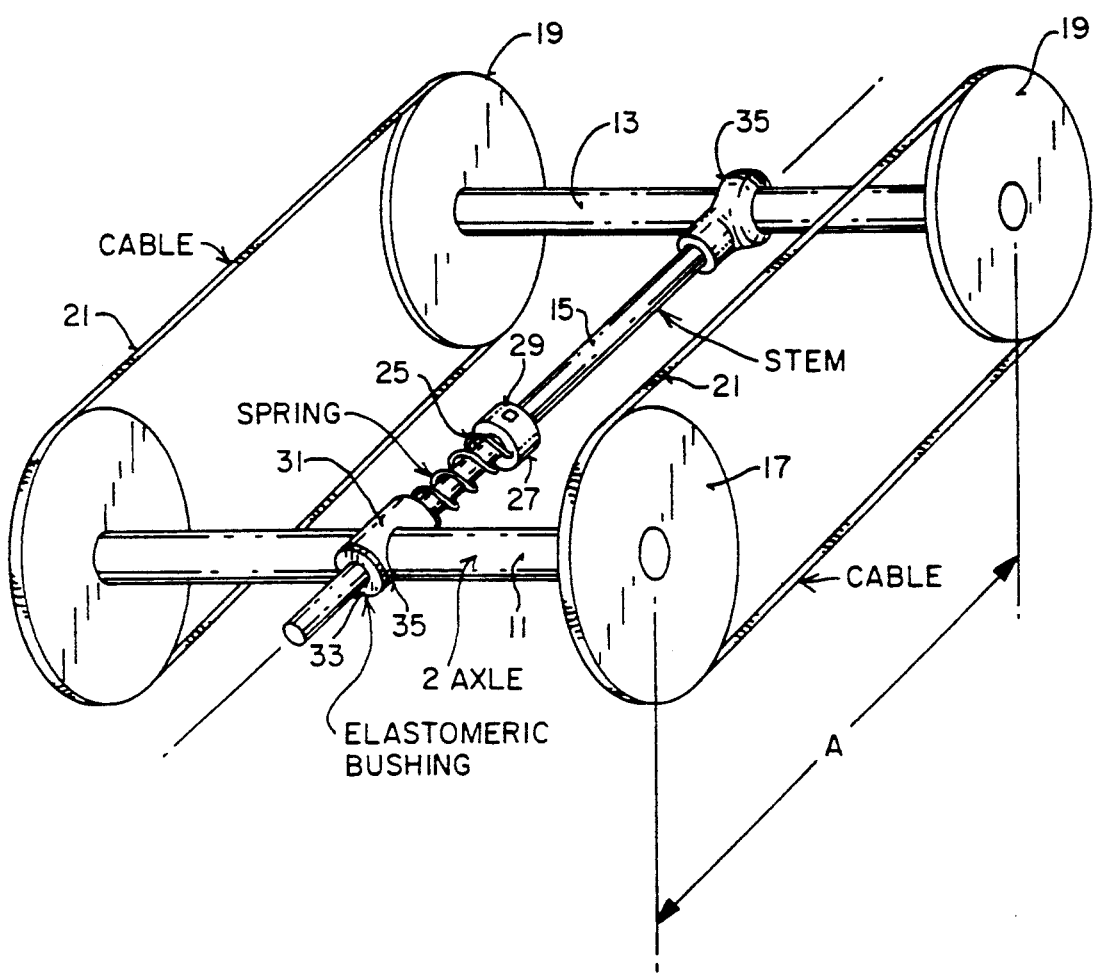
FIG. 1 is a schematic view of a two-wheeled vehicle forming the basis for the present invention.
Figure 1A:
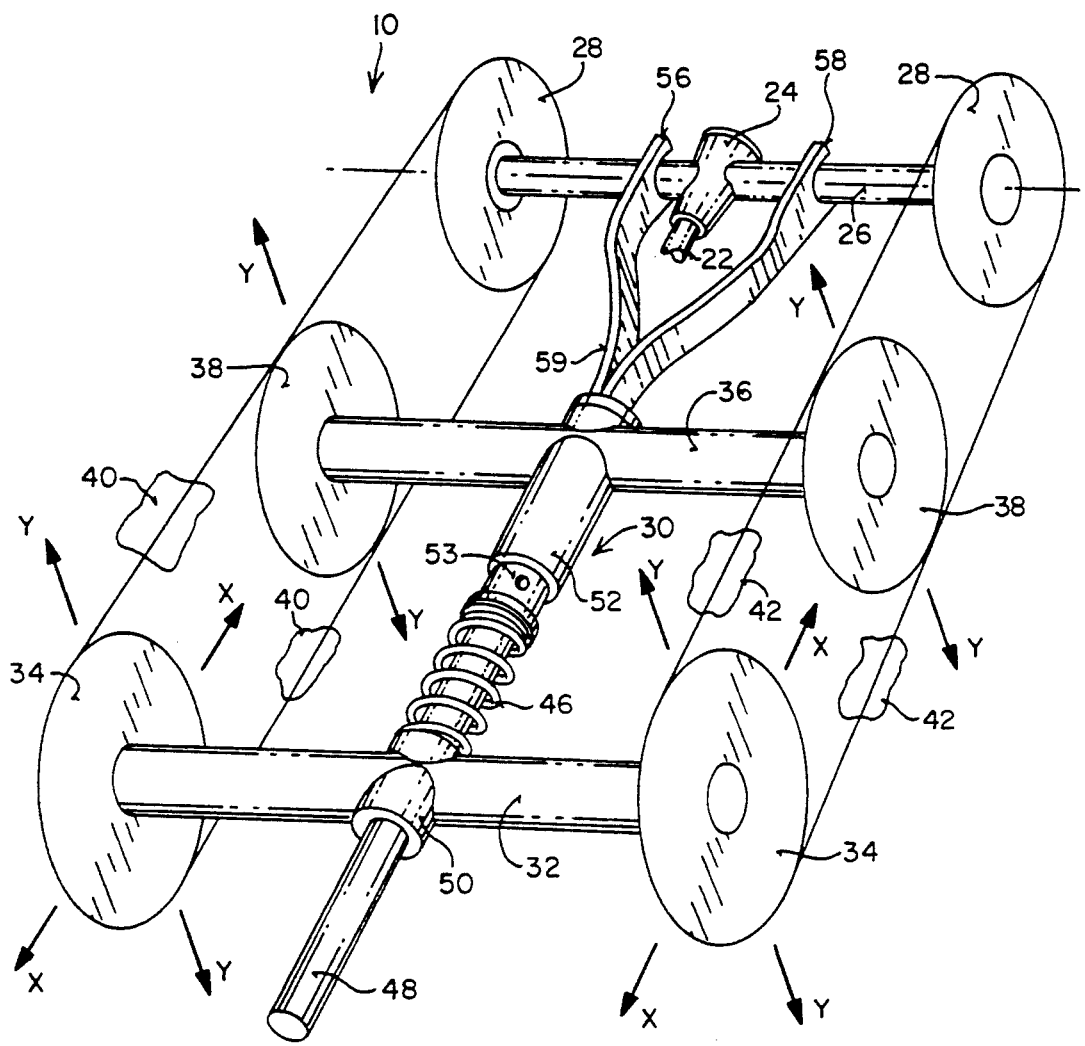
FIG. 1A is a schematic, perspective view of a basic tracked vehicle having six wheels and being provided with a T-bar assembly for keeping tension on the tracks.

The first embodiment of the vehicle of the present invention is broadly denoted by the numeral 10 and is shown in FIGS. 1A, 2 and 3. Vehicle 10 is in the form of a truck as shown in FIGS. 2 and 3 and comprises a pivotal cab 12 having a pair of steerable front wheels 14, an engine 16 beneath a hood 18, and a transmission 20 for coupling, by way of a drive rod 22, the motor to the differential 24 coupled to the rear axle 26 having wheels 28 thereon. The drive train or rod 22 is coupled to the differential when the differential is at an inclined position so as to avoid interference between the drive train or rod 22 and a T-bar assembly 30 hereinafter described in detail.

Vehicle 10 includes a first or front axle 32 directly behind cab 12 of the vehicle. Axle 32 has wheels 34 at the outer ends thereof. The wheels can be dual or single. The axle 32 is forwardly of a second or middle axle 36 having wheels 38 at the outer ends thereof. Axle 3 is spaced forwardly of axle 26.

A pair of endless, flexible belts 40 and 42 present two tracks which are wrapped around the wheels at respective sides of the vehicle. Belts 40 and 42 are industrial conveyor belting and are strong and highly flexible so as to be wrapped around the wheels 26 and 32 in the manner shown in FIGS. 2 and 3.

Figure 7:
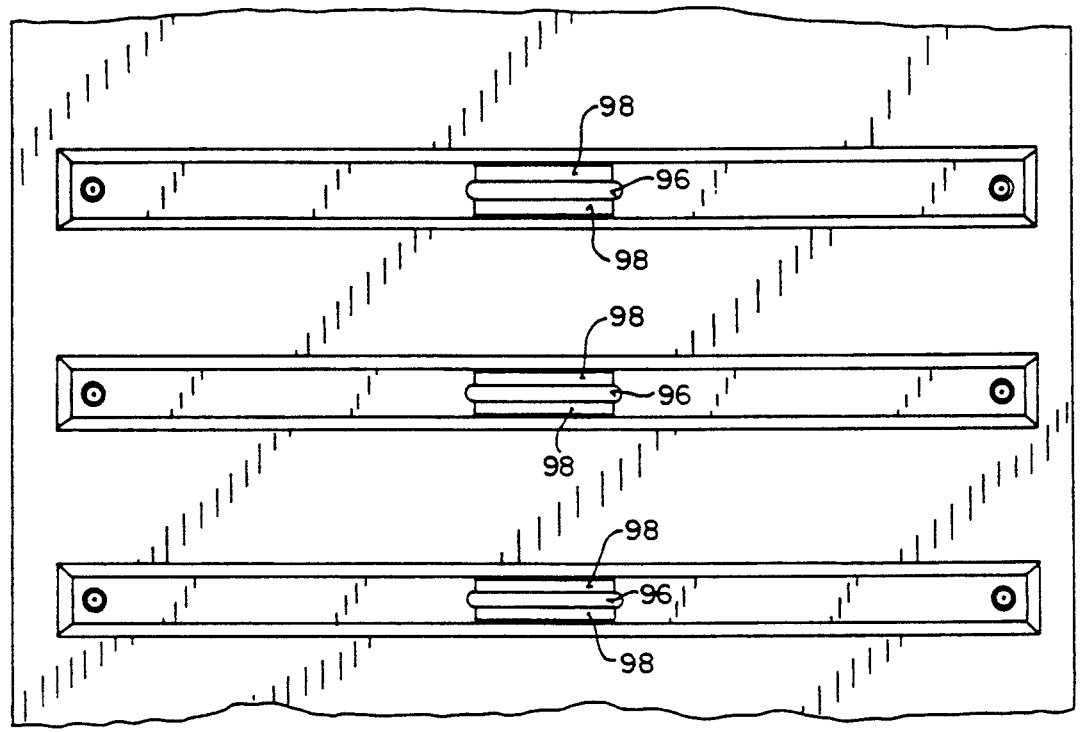
FIG. 7 is a plan view of the inner surface of a track of the vehicle of the present invention.
Figure 8:
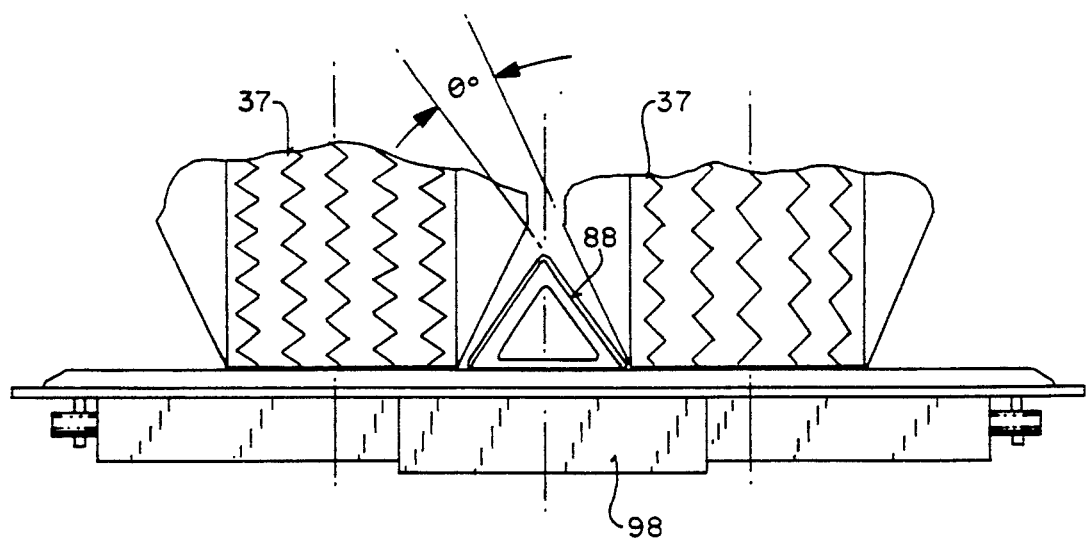
FIG. 8 is a fragmentary, front elevational view of the track of FIG. 7 showing the position of two tires of the vehicle relative to the inner surface of the track.
Figure 9:
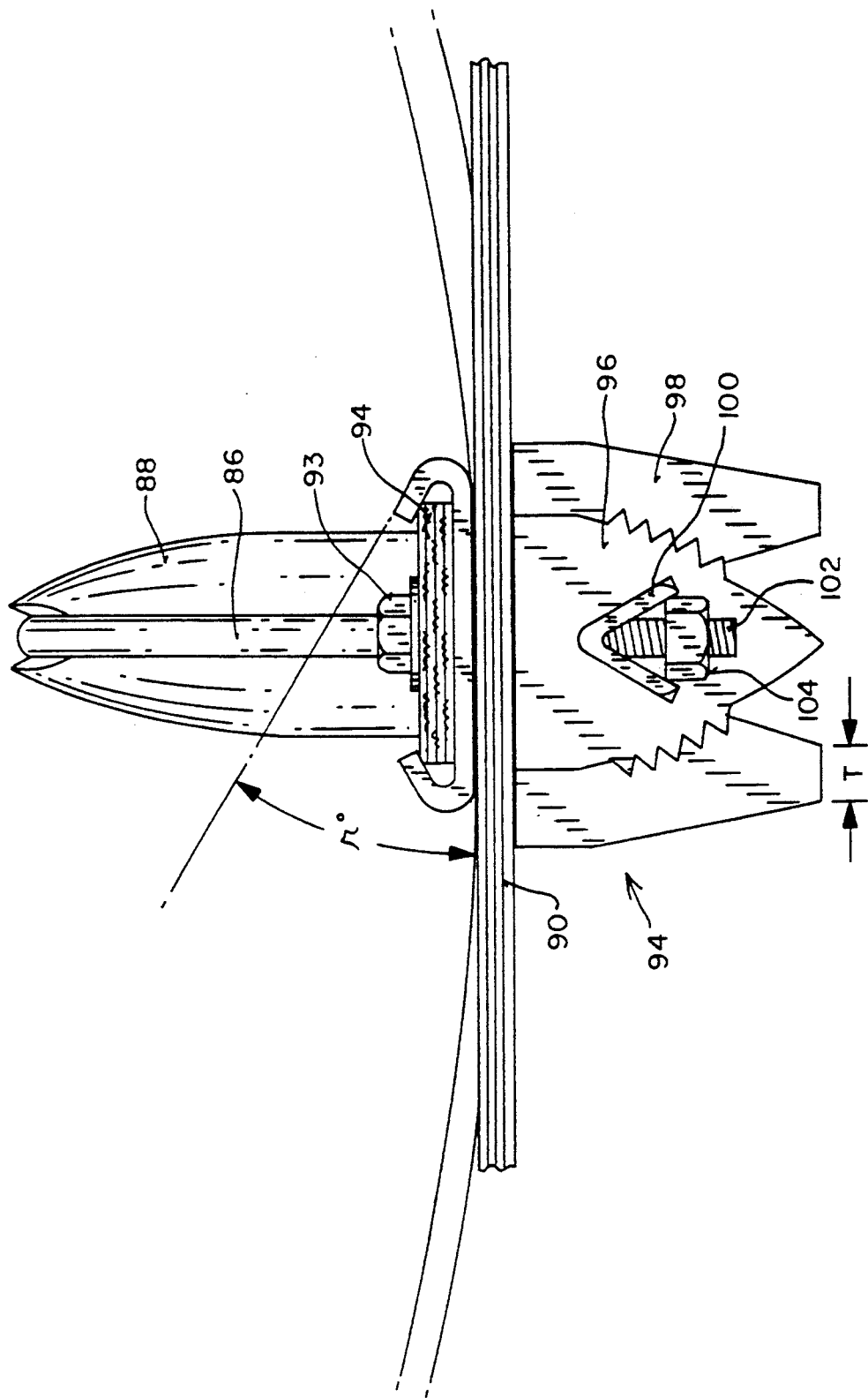
FIG. 9 is an enlarged, front elevational view of a grouser station near one of the belts forming a track of the vehicle.

Each track 40 and 42 has a plurality of grousers 44 which extend laterally of the tracks shown in FIG. 2 and each grouser is shown in more detail in FIGS. 7–9.

The T-bar assembly 30 (FIG. 1A) can be basically described with respect to the schematic drawings shown in FIG. 1 which parallel front and rear axles 11 and 13 are interconnected by an elongated member or stem 15, each of the axles 11 and 13 having pulleys 17 and 19 respectively with a pair of endless, flexible, resilient cables 21 and 23 coupled with the pulleys 17 and 19. A coil spring 25 is in surrounding relationship to stem 15 and a sleeve or collar 27 is adjustably secured by set screw 29 to stem 15 and a front end of the coil spring bears against the rear end of a short tube 31 carried by front axle 11. Stem 15 is shiftably mounted in tube 31 and has an elastomeric bushing 33 surrounding the stem to allow misalignment of tube 31 relative to tube 15. The rear end of stem 15 is coupled by a forked member 35 to axle 13. The assembly shown in FIG. 1 is in equilibrium with the spring 25 under compression and providing tension on the cables 21 and 23.

Any force which would deflect the cables or twist the axle 11 with respect to axle 13 would shorten the dimension A, the distance between axles 11 and 13. This would cause a further compression of spring 25. The T-bar concept provides one large spring to tension the cables then provide a suspension for the wheels or pulleys 17 on axle 11. Placed on an uneven surface, the pulleys 17 and 19 and cables 21 and 23 can conform to the surface contours. Even though the system is misaligned, the cables remain on the pulleys and remain on track. The force required for misalignment is a function of the spring rate and the length of the cables.

The T-bar concept is a structural feature of spreading out and evenly applying power or transmitting power between a drive mechanism and a surface. It may be used for feeding paper through a copy machine, plywood through a saw or propelling different types of vehicles over all terrain. It can be designed in all sizes from toys to large trucks. It can also be used with an amphibious vehicle which will hydroplane over the surface of water in excess of 40 miles per hour using the tracks as propulsion sources.

A third or fourth axle can be placed between axles 11 and 59 to increase the track length and the load carrying capacity of the vehicle. Axle 13 can be a differential axle. On a truck, the differential can either be located immediately behind the cab of the truck with the stem extending to the rear, or the differential can be located at the rear of the truck with the stem extending forwardly as shown in FIG. 1A. The system can be installed on a trailer for hauling heavy loads over soft material with minimal impact.

T-bar assembly 30 for use with truck 10 includes a coil spring 46 which surrounds a longitudinally extending rod or stem 48 which passes through a sleeve 50 in front axle 32. The spring is between axle 32 and a second sleeve 52 which is secured to middle axle 36. The rod extends through and is shiftably mounted in sleeves 50 and 52. The rear end of rod 48 has a forked member 54 which has ends 56 and 58 pivotally mounted on rear axle 26. The drive rod or train 22 coupled to differential 24 passes above T-bar assembly 30 and is coupled to the transmission 20 in the manner shown in FIGS. 2 and 3.

Spring 46 is under compression when it bears against sleeve 52 and sleeve 50. This compression of the spring keeps tension on tracks 40 and 42 and the tension tends to force axles 26 and 32 apart with axle 36 being also in driving relationship to the tracks 40 and 42. The tension on the tracks is achieved by an adjustable bias force defined by keeping the spring under compression. The compression can be adjusted by shifting a sleeve or collar 53 on shaft 48 relative to sleeve 52. This effectively exerts a force on front axle 32 and rear axle 26, tending to keep the axles 26 and 32 apart and thereby tending to keep tension on the tracks 40 and 42.

In the alternative, a fluid piston and cylinder assembly 55 (FIG. 2) can be used in place of the collar 53 to exert an adjustable compression force on spring 46 so as to increase or decrease the bias force which the T-bar assembly 30 exerts on front axle 32 and rear axle 26. Low tension is for speed and high tension is for slow climbing.

Cab 12 can pivot upwardly and downwardly with respect to axle 24 by use of a pair of angled fluid piston and cylinder assemblies 60 and 62 (FIG. 3A) coupled by their piston rods 64 and 66 to a rod segment 48A. This rod segment is pivotally mounted on pins 49 and 51 on axle 23. Pins 44 and 51 allow pivoting of cab 12 about the horizontal axis of axle 24.

The outer ends of assemblies 60 and 62 are pivotally coupled by pins 66 and 68 to longitudinal extending frame segments 70 and 72 which extend lengthwise of the tracks 40 and 42 as shown in FIG. 2.

Figure 4:
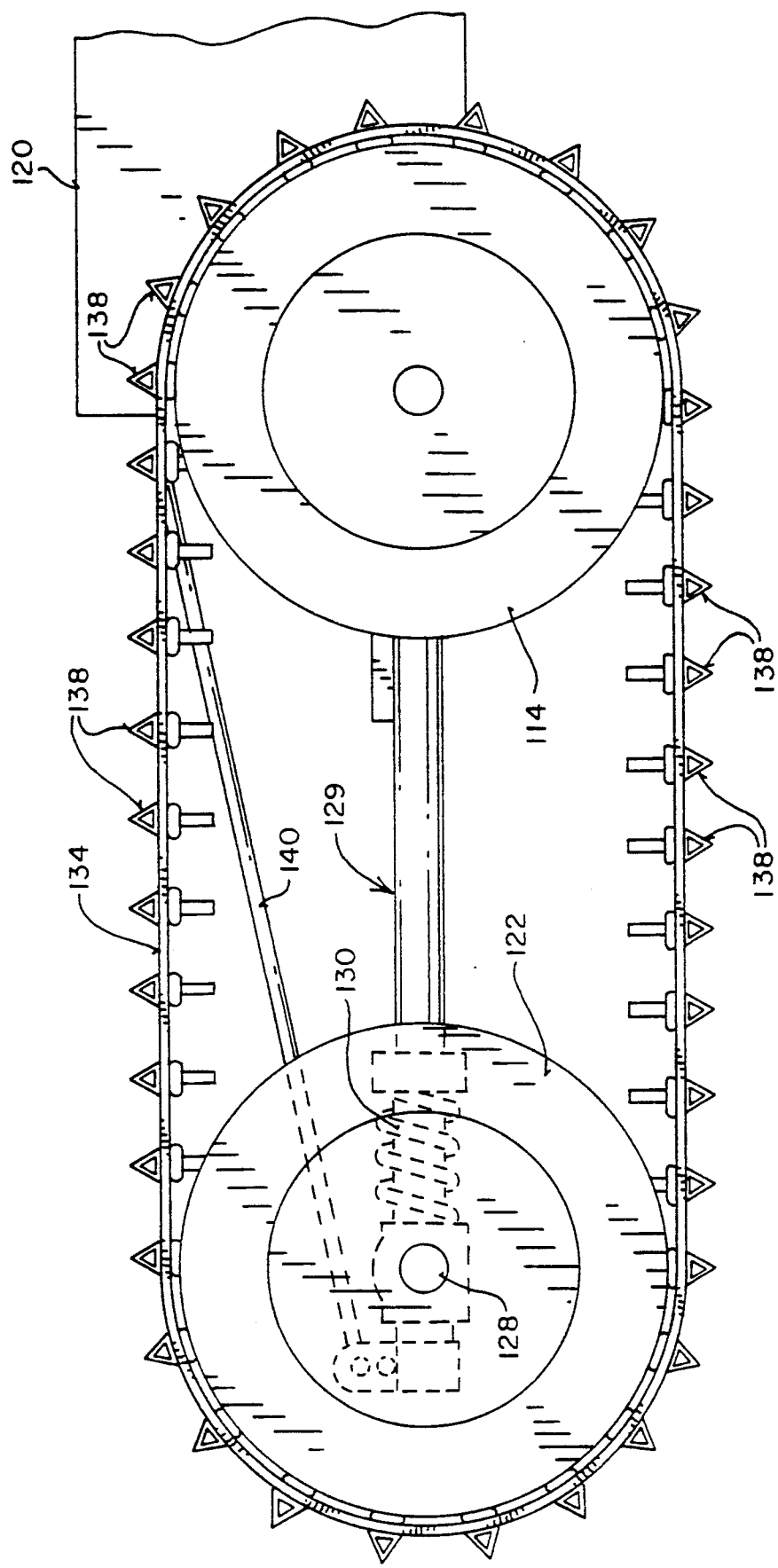
FIGS. 4 and 5 are side and top plan views of the T-bar assembly for a tractor.
Figure 5:
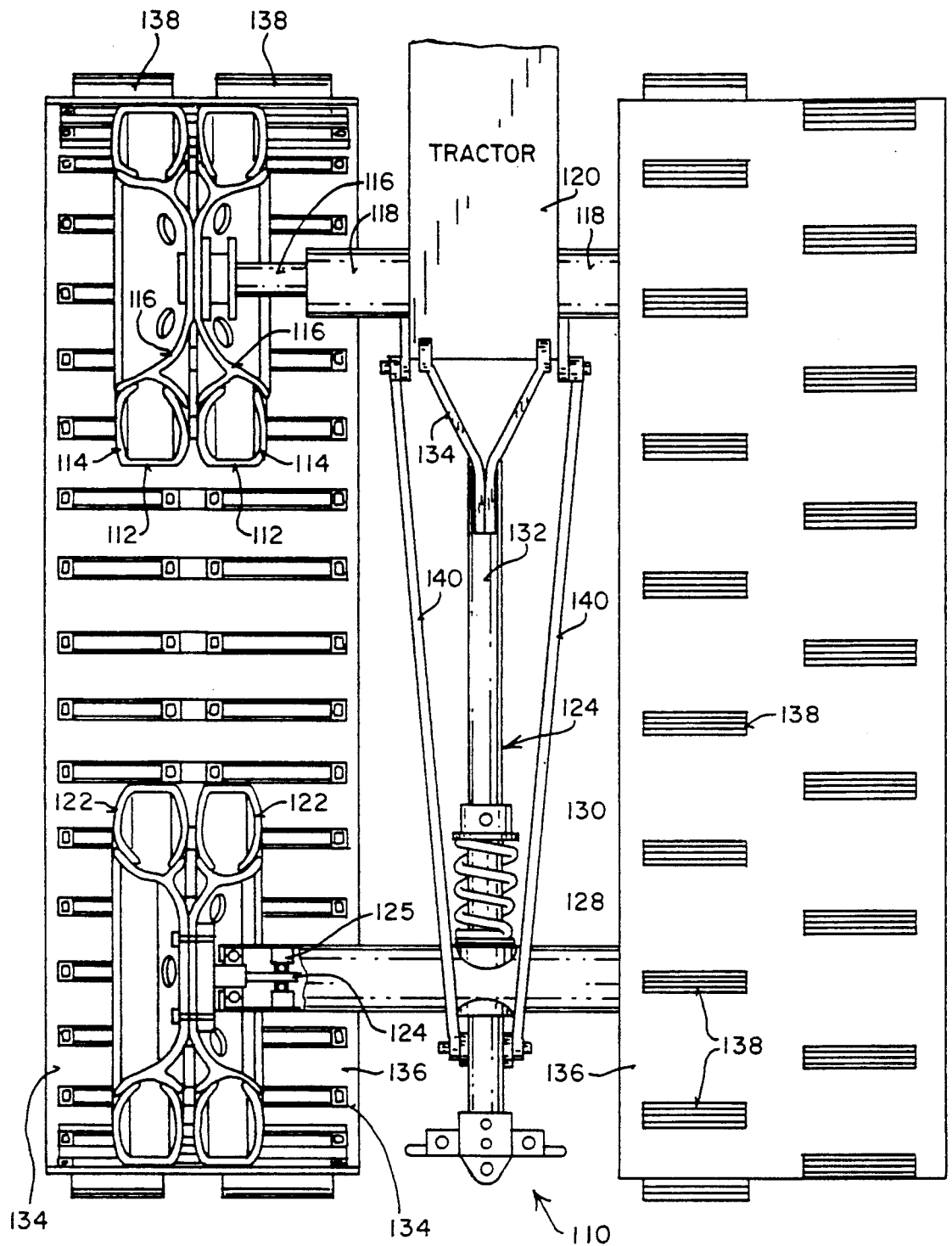
Figure 5A:
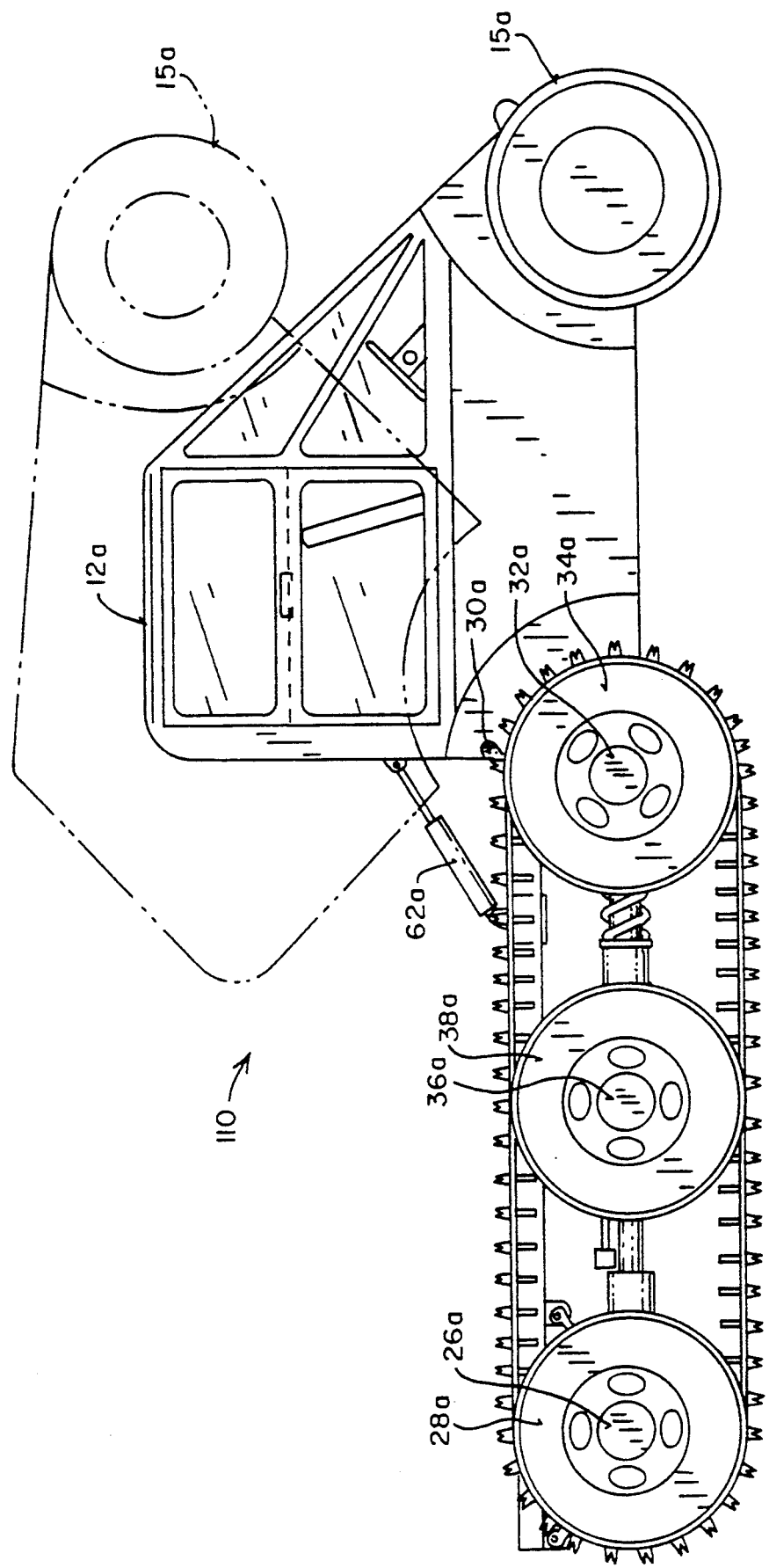
Figure 6:
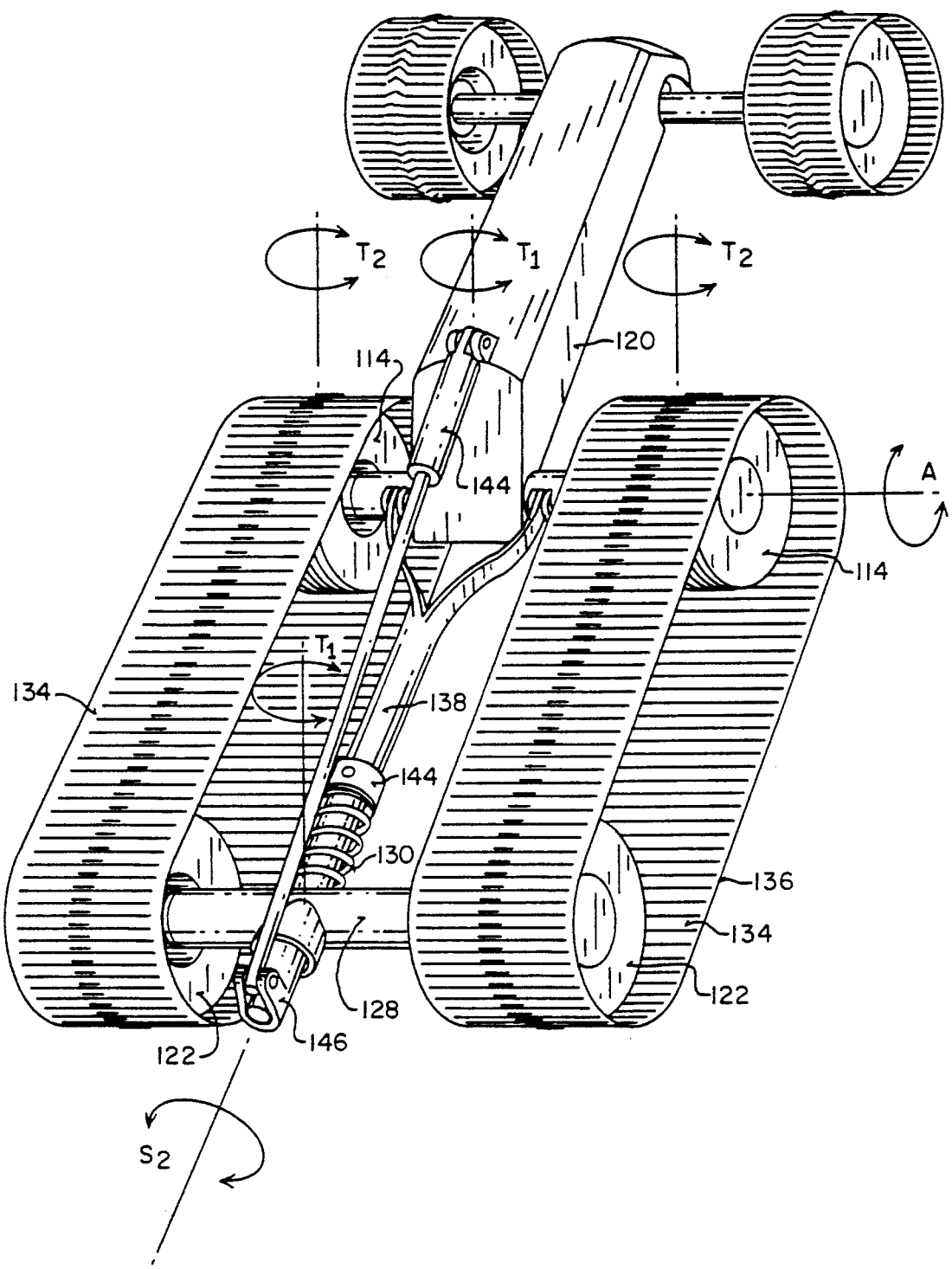
FIG. 6 is a perspective view of the tractor configuration of the present invention.
Figure 6A:
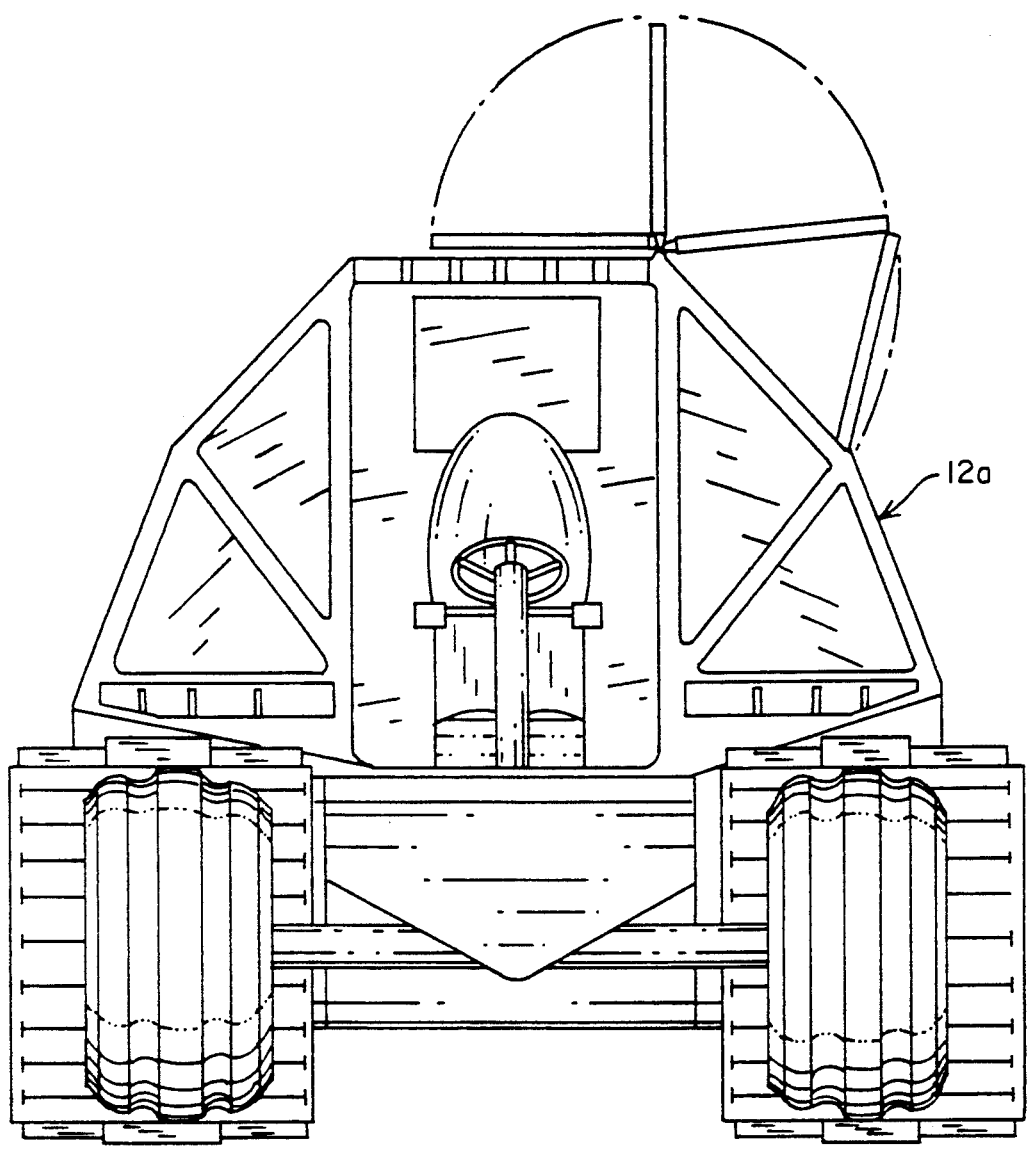

FIGS. 4A, 5A and 6A show views of a special, all-terrain vehicle 73 with amphibious capability. It is similar to vehicle lo (truck) in that it has a pivotal cab 12a pivotal about a horizontal axis 31a above a front axle 32a at the rear of the cab 12a. Vehicle 73 also has a middle axle 36a and a rearmost axle 26a. Wheels with tires are mounted on the respective axles 26a, 32a and 36a at the ends of the axles. A pair of endless flexible tracks 40a and 42a are coupled under tension to the tires associated with wheels 34a, 38a and 28a.

A T-bar suspension on vehicle 73 comprises a spring 46a surrounding a stem 48a. The spring is under compression by means of a piston and cylinder assembly 49a. One end of assembly 49a bears against the spring (FIG. 4A) and the opposite end of the assembly 49a bears against the rearmost axle 26a. A differential 22a is coupled to axle 26a and is coupled by a drive rod (not shown) to the transmission (not shown) of a motor (not shown) carried by the cab 12a.

A pair of fluid piston and cylinder assemblies 60a and 62a are carried by frame members 64a of vehicle 13. These assemblies 60a and 62a cause cab 12a to pivot to elevate front wheels 15a of cab 12a.

Spring 46a keeps tension on the tracks 40a and 42a.

Figure 10:
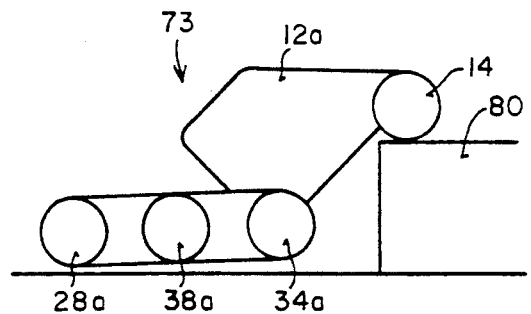
FIGS. 10–16 are schematic views of the truck version of the present invention, showing a truck climbing an obstacle in FIGS. 10–13 and being adjusted to position and weight at a certain location for steering, maneuvering and floating on water.

Frame segments 70 and 72 of vehicle 10 are pivotally coupled by plates 74 and 76 (FIG. 2) on axle 32 so that the segments and cab 12 can pivot relative to axle 26. The vehicle 73 (FIGS. 4A, 5A and 6A) can be operated to cause pivoting of cab 12a about axis 31a (FIG. 5A). Thus, vehicle 73 can assume the configuration in FIG. 10 in which the cab 12a and front wheels 15a can move over an obstacle 80 by first having the front wheels climb the obstacle as shown in FIG. 10 as the other wheels remain on the ground and keep the tension on tracks 40 and 42.

Figure 11:
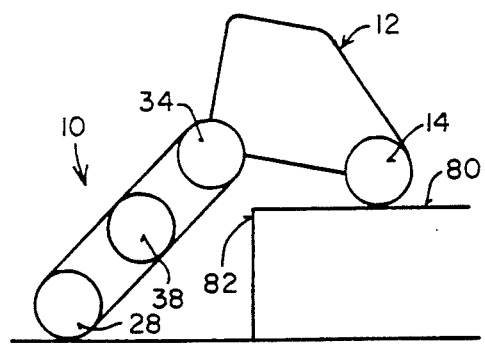
Figure 12:
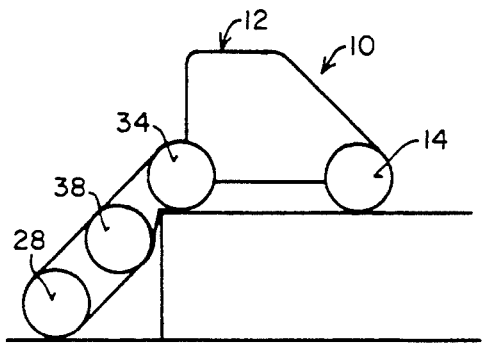
Figure 13:
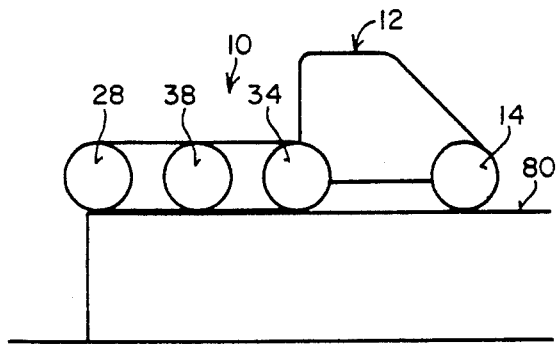

When the front wheels 15a are spaced a distance from the initial edge 82 of obstacle 80 as shown in FIG. 11, piston and cylinder assemblies 60a and 62a will be actuated to cause the cab 12a to be tilted downwardly with respect to the longitudinal axes of tracks 40a and 42a and into the FIG. 11 position, whereupon rear wheels 28a drive the vehicle 73 forwardly until the wheels 34a of axle 32a engage the upper surface of the obstacle 80 as shown in FIG. 12. Continued movement of vehicle 73 under the influence of rear wheels 28 causes the three axles 32a, 36a and 26a to eventually move up and onto the upper surface of the obstacle 80 as shown in FIG. 13.

Figure 14:
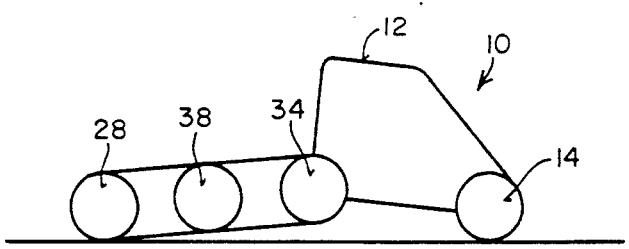
Figure 15:
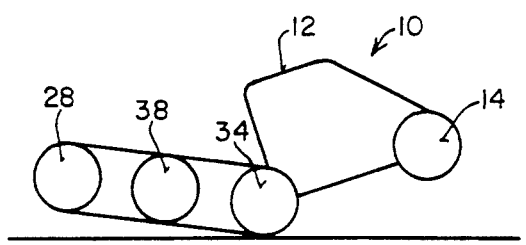
Figure 16:
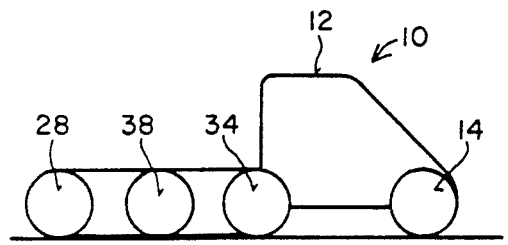

FIG. 14 shows the vehicle 73 with the weight forwardly for steering purposes. FIG. 15 shows the weight at the center of the vehicle 73 for maneuvering. In this case, the rear axle 26a and center axle 36a are elevated above the surface of the ground while wheels 28a are spaced above the ground and each track is engaging the ground at the front wheels 34a as shown in FIG. 15. FIG. 16 shows the vehicle 73 when the wheels and tires thereof render the vehicle amphibious for floating and moving on water.

Each grouser assembly 44 for vehicle 10 and vehicle 73 includes, as shown in FIG. 9, a tire guide bolt 86 in a tire guide block 88 which projects inwardly from the track belt 40 as shown in FIG. 9. A nut 93 is on tire guide bolt 86 between the ends thereof. The tire guide bolt extends through the deicing pad 94 held by a bracket 87 on belt 40. A primary grouser 96 is within a secondary grouser 98 on the outer surface of the belt 40. An outer bar 100 receives the end 102 of bolt 86 and a nut 104 is threaded onto the bolt.

The primary grouser 96 is in the secondary grouser 98, the latter grouser being shown in FIG. 8 on the outer surface of track 40. The tire guide block 88 is between the two tires 37 of axle 36 and the angle $\Theta$ made between the side of the block 88 and the side of the tire 37 is in the range of at least 5° to 10° to prevent wear of the tire on the block 88.

Secondary grouser 98 houses the primary grouser 96 and a secondary grouser 98 is shown on the outer face of one of the tracks 40 and 42 in FIG. 8. The primary grouser 96 as shown in FIG. 7 is between the sides of the secondary grouser 98.

A second embodiment of the vehicle of the present invention is broadly denoted by the numeral 110 and is shown in FIGS. 4-6. Vehicle 110 is a tractor having the T-bar attachment of the present invention coupled thereto. To this end, the tractor includes a rear axle 111 and a pair of rear wheels 112 on each end of the axle 111. Only one pair of wheels is shown in FIG. 5. The wheels 112 include tires 114 which are mounted on rims 116 which are coupled together and coupled to axle 111 on each side of the tractor body 120.

A rear axle 128 is spaced rearwardly of axle 111 and has a pair of rear tires 122 at each side of the vehicle, the tires being coupled to the shaft 124 carried by bearings 125 in axle 128.

A T-bar assembly 129 has a coil spring 130 under compression and surrounding a rod or stem 132 provided with a forked member 134 pivotally coupled to tractor body 120 in the manner shown in FIG. 5. The rear end of compression spring 130 bears against axle 128 and biases axle 128 and axle 111 apart so as to keep tension on a pair of endless flexible belts 134 and 136 having grouser assemblies 138 on the outer surface thereof as shown in FIGS. 5 and 6. A pair of rods 140, only one of which is shown in FIG. 6 couples a fluid piston and cylinder assembly 144 with the rear end 146 of tube 138. A sleeve 149 is used to adjust the compression of coil spring 130, whereby the tracks 134 and 136 will be caused to crown and thereby provide the proper mode or configuration for the belts operation of the vehicle 110.

Typical operation characteristics of vehicle 73 include dimensions:
 18 ft. long, 8 ft. wide and 7 ft. high;
 Weight: 5000 lbs.

Track area: 5720 in.²
Flotsam factor: <1
Drive: 350 V8 or diesel
Turning radius: 4 ft.
Chasm span: 8 ft.
Vertical object capacity: 6 ft.
Steering: steering wheel for gradual turns, left and right brakes for maneuvering
Speed: 50 mph plus.

What is claimed is:

1. A vehicle movable over all kinds of terrain comprising:
   a pair of spaced, generally parallel axles, each axle having a pair of rotatable wheels at respective outer ends of the axle, the wheels of one axle being aligned with respective wheels of the other axle;
   a rod coupled at one end to a first of said axles, said rod extending to and shiftably coupled at the opposite end to the second axle;
   a pair of tracks for respective sides of the vehicle, each track being an endless, flexible belt under tension wrapped about a respective pair of aligned wheels;
   means biasing the axles away from each other to maintain tension on the belts; and
   grouser means carried by each track, respectively, for coupling the track to respective side wheels in driving relationship to the track, said second axle has a tubular body extending therethrough, said rod shiftably extending through the tubular body and being axially movable with respect thereto, said bias means including a spring operable to bias the axles away from each other to thereby provide tension in the belts.

2. A vehicle as set forth in claim 1, wherein said bias means is a coil spring under compression.

3. A vehicle as set forth in claim 1, wherein said spring is a coil spring and is adjustable in length to vary the bias force separating the two axles.

4. A vehicle as set forth in claim 1, wherein the opposite end of the rod member body is pivotally coupled to said first axle.

5. A vehicle as set forth in claim 1, wherein is included a third axle between the first and second axles, said third axle having a pair of wheels at respective ends of the third axle, said third set of wheels being between respective tracks.

6. A vehicle as set forth in claim 1, wherein each wheel has a tire thereon, said tires being engagable with the grouser means for coupling the tires to the tracks.

7. A vehicle as set forth in claim 1, wherein said vehicle has a cab and an engine with a transmission, there being a differential carried by the first axle, and a drive means coupling the transmission with the differential.

8. A vehicle as set forth in claim 7, wherein the differential is tilted so that its drive means is coupled to the differential at an inclined angle.

9. A vehicle as set forth in claim 1, wherein said wheels have buoyant tires thereon.

10. A vehicle as set forth in claim 1, wherein is included a cab pivotally mounted on one axle.

11. A vehicle as set forth in claim 10, wherein the cab pivots about said first axle.

12. A vehicle as set forth in claim 10, wherein the cab pivots about an axis adjacent to and spaced above the second axle.

13. A vehicle movable over all kinds of terrain comprising:
   a pair of spaced, generally parallel axles, each axle having a pair of rotatable wheels at respective outer ends of the axle, the wheels of one axle being aligned with respective wheels of the other axle;
   a rod coupled at one end to a first of said axles, said rod extending to and shiftably coupled at the opposite end to the second axle;
   a pair of tracks for respective sides of the vehicle, each track being an endless, flexible belt under tension wrapped about a respective pair of aligned wheels;
   means biasing the axles away from each other to maintain tension on the belts; and
   grouser means carried by each track, respectively, for coupling the track to respective side wheels in driving relationship to the track, said first axle having a differential, said rod including a forked element having ends engaging the differential and permitting the first axle to articulate relative to the tracks.

14. A vehicle movable over all kinds of terrain comprising:
   first, second and third spaced, generally parallel axles, each axle having a pair of rotatable wheels at respective outer ends of the axle, the wheels of one axle being aligned with respective wheels of the other axles;
   a rod coupled at one end to a first of said axles, said rod extending to and shiftably coupled at the opposite end to the second and third axles;
   a pair of tracks for respective sides of the vehicle, each track being an endless, flexible belt under tension wrapped about a respective pair of aligned wheels;
   means biasing the axles away from each other to maintain tension on the belts; and
   grouser means carried by each track, respectively, for coupling the track to respective side wheels in driving relationship to the track, said bias means includes said rod shiftable through the second and third axles, and including a forked element coupled to said rod and projecting from the first axle, the outer ends of the fork element being shiftably received by said first axle.

* * * * *